United States Patent
Rytter

(10) Patent No.: US 8,082,954 B2
(45) Date of Patent: Dec. 27, 2011

(54) FLEXIBLE PIPE WITH A PERMEABLE OUTER SHEATH AND A METHOD OF ITS MANUFACTURING

(75) Inventor: Jan Rytter, Svenstrup J (DK)

(73) Assignee: NKT Flexibles I/S, Brondby (DK)

( * ) Notice: Subject to any disclaimer, the term of this patent is extended or adjusted under 35 U.S.C. 154(b) by 1199 days.

(21) Appl. No.: 10/575,134

(22) PCT Filed: Oct. 29, 2004

(86) PCT No.: PCT/EP2004/052737
§ 371 (c)(1),
(2), (4) Date: Apr. 6, 2006

(87) PCT Pub. No.: WO2005/043020
PCT Pub. Date: May 12, 2005

(65) Prior Publication Data
US 2007/0119512 A1   May 31, 2007

(30) Foreign Application Priority Data
Oct. 31, 2003   (DK) .............................. 2003 01622 U

(51) Int. Cl.
*F16L 11/00* (2006.01)
(52) U.S. Cl. ......... 138/126; 138/130; 138/132; 138/135
(58) Field of Classification Search .................. 138/135, 138/126, 130, 132
See application file for complete search history.

(56) References Cited

U.S. PATENT DOCUMENTS

| | | | | |
|---|---|---|---|---|
| 2,151,307 A | * | 3/1939 | Smith | 138/130 |
| 2,969,812 A | * | 1/1961 | De Ganahl | 285/238 |
| 3,479,670 A | * | 11/1969 | Bridgman | 623/1.33 |
| 3,481,368 A | * | 12/1969 | Vansickle et al. | 138/125 |
| 3,506,040 A | * | 4/1970 | Everling et al. | 138/130 |
| 3,559,693 A | * | 2/1971 | Reynard et al. | 138/133 |
| 3,790,419 A | * | 2/1974 | Atwell et al. | 156/149 |
| 3,791,898 A | * | 2/1974 | Remi | 156/143 |
| 4,019,539 A | * | 4/1977 | Hoffmann et al. | 138/118 |
| 4,266,579 A | | 5/1981 | Deiss | |
| 4,276,908 A | * | 7/1981 | Horne | 138/125 |
| 4,308,895 A | * | 1/1982 | Greco | 138/125 |
| 4,402,346 A | * | 9/1983 | Cheetham et al. | 138/129 |
| 4,549,581 A | * | 10/1985 | Unno et al. | 138/109 |

(Continued)

FOREIGN PATENT DOCUMENTS

JP   3265781   3/1990

(Continued)

*Primary Examiner* — James Hook

(74) *Attorney, Agent, or Firm* — Pearne & Gordon LLP

(57) ABSTRACT

A flexible pipe for transporting a fluid in a marine environment. The pipe comprises a liner for confining the fluid, an armoring layer surrounding the liner, and an outer protective sheath surrounding the armoring layer and allowing radial expansion and contraction of the armoring layers. The outer protective sheath comprises at least two protective layers of helically wound composite wires with essentially opposite winding angles and locally held together, providing a relatively flexible yet fixed structure of the outer sheath. The outer sheath is held together in an array of discrete spots or along linear or curved paths. Flexibility is maintained because the stiffness in shear in the wires of adjacent protective layers may be made much larger in areas being locally held together than outside these areas. This allows a change of angles between the wires of two adjacent layers of the outer protective sheath during elongation or shortening of the pipe.

27 Claims, 7 Drawing Sheets

U.S. PATENT DOCUMENTS

| | | | | |
|---|---|---|---|---|
| 4,585,035 A * | 4/1986 | Piccoli | | 138/127 |
| 4,850,395 A | 7/1989 | Briggs | | 138/30 |
| 5,269,349 A | 12/1993 | Sugier et al. | | 138/172 |
| 6,085,798 A | 7/2000 | Le Nouveau | | 138/125 |
| 6,165,586 A | 12/2000 | Nouveau et al. | | 428/105 |
| 6,273,142 B1 * | 8/2001 | Braad | | 138/109 |
| 6,360,780 B1 * | 3/2002 | Adolphs et al. | | 138/98 |
| 2002/0100516 A1 | 8/2002 | Powell et al. | | 138/125 |
| 2003/0121559 A1 * | 7/2003 | Glejbol et al. | | 138/135 |
| 2003/0164196 A1 * | 9/2003 | Glejbol et al. | | 138/136 |
| 2003/0183293 A1 | 10/2003 | Fraser | | |
| 2004/0112450 A1 * | 6/2004 | Hsu | | 138/38 |
| 2006/0191587 A1 * | 8/2006 | Gerez et al. | | 138/130 |
| 2008/0190508 A1 * | 8/2008 | Booth et al. | | 138/142 |

FOREIGN PATENT DOCUMENTS

| | | |
|---|---|---|
| WO | WO 02/01104 A1 | 1/2002 |
| WO | WO 02/090818 A1 | 11/2002 |
| WO | WO 03/019064 A1 | 3/2003 |

* cited by examiner

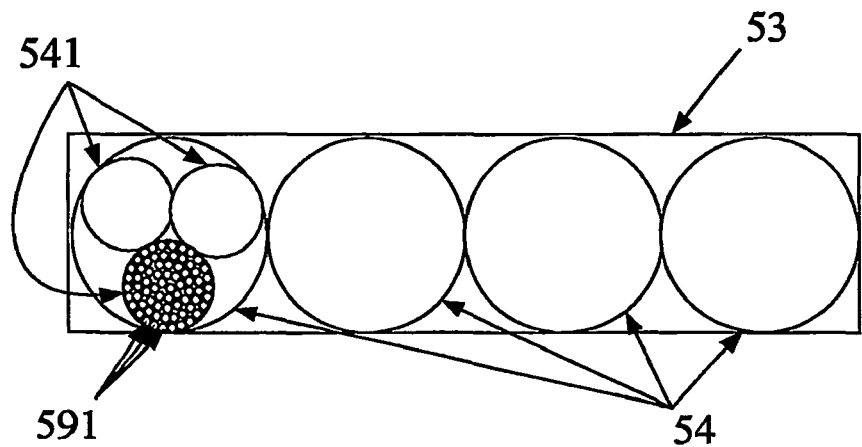
FIG. 6
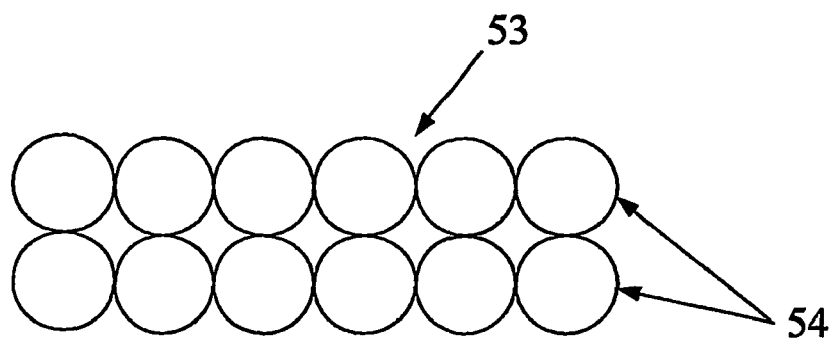
FIG. 7.a
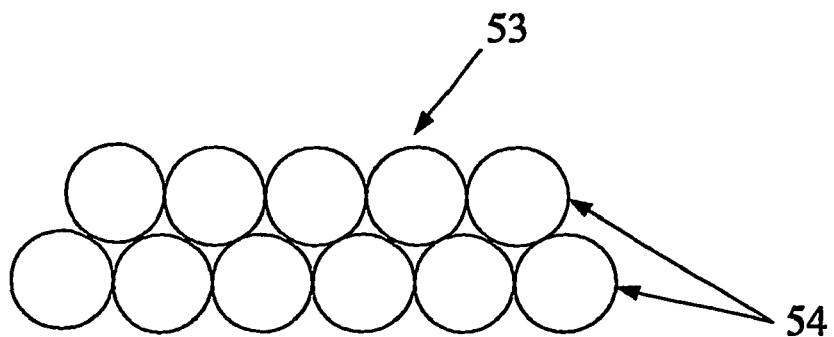
FIG. 7.b

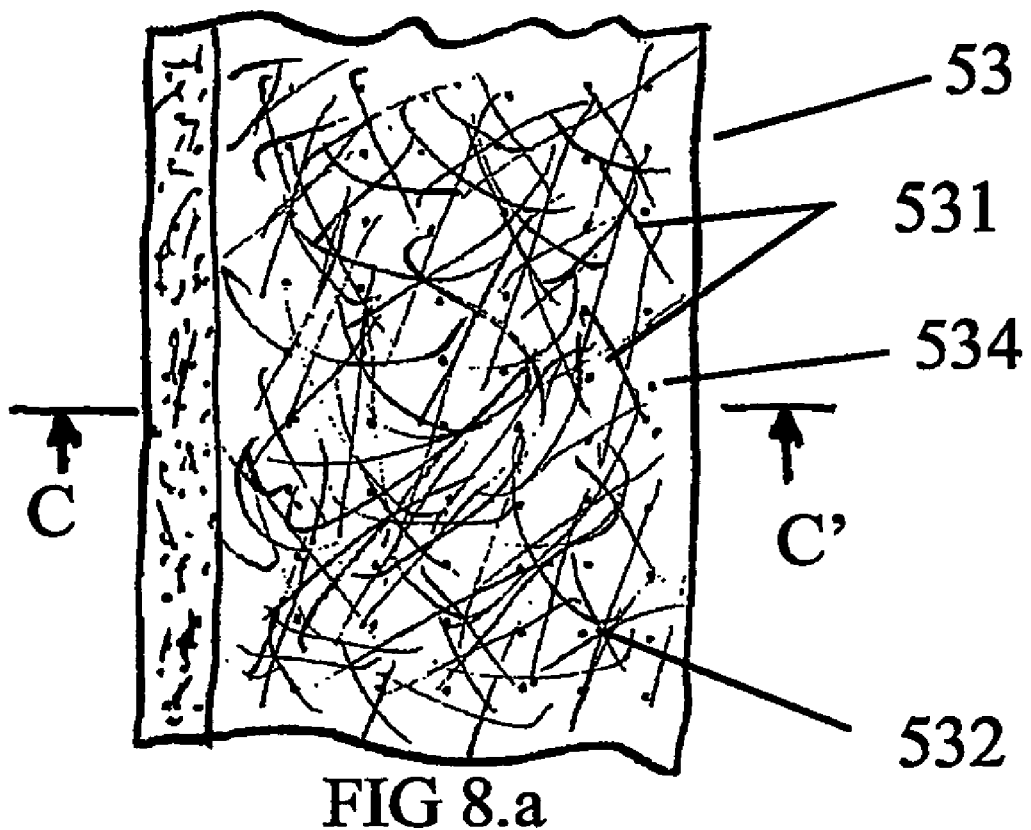
FIG 8.a
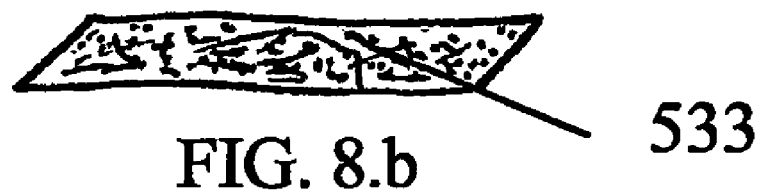
FIG. 8.b

US 8,082,954 B2
FLEXIBLE PIPE WITH A PERMEABLE OUTER SHEATH AND A METHOD OF ITS MANUFACTURING

TECHNICAL FIELD

The invention relates to a flexible pipe for transporting a fluid in a marine environment, the pipe comprising a) a liner for confining the fluid to be transported by the pipe, b) an armouring layer surrounding the liner, c) an outer protective sheath surrounding the armouring layer.

The invention furthermore relates to: A method of manufacturing a flexible pipe for transporting a fluid in a marine environment, the method comprising the steps of a) providing a liner for confining the fluid to be transported by the pipe, b) providing an armouring layer surrounding the liner, c) providing an outer protective sheath surrounding the armouring layer.

The invention may e.g. be useful in applications such as transport of pressurized liquids and gases (e.g. hydrocarbons, water, etc.), e.g. at elevated temperatures, in marine environments (i.e. environments comprising water, e.g. salt or fresh).

BACKGROUND ART

Flexible pipes of the above type are e.g. used for the transport of oil and gas at large or varying sea depths, e.g. from under water wells to installations at the surface of the sea where the oil or gas is refined or sent on for processing.

The construction of pipes of this kind is e.g. known from JP-3265781, wherein a flexible armoured pipe is described. The armouring is surrounded by a tight sheath which prevents the penetration of fluids from the surroundings to the armouring of the pipe whereby the armouring has to absorb forces from internal as well as external pressures.

A problem with this type of pipe is that the armouring layer—because of the tight sheath around it—has to be able to withstand the chemical activity from fluids escaping from the interior of the pipe, e.g. by diffusion and thereby accumulates around the armouring layers.

On the other hand, U.S. Pat. No. 4,402,346 describes a pipe wherein the armouring is surrounded by a permeable outer sheath, which has the advantage that aggressive gases diffusing out through the liner will not be accumulated in the volume around the armouring profiles.

A problem with both types of pipes is that the outer sheath—permeable or not—may hinder a radial expansion of the wound armouring layers which may result in the creation of critically large compressive forces in the armouring layer when the pipe is subject to an outer hydrostatic pressure. These compressive forces may lead to bursting of the outer sheath or to instability of the armouring profiles resulting in damaging deformations.

One solution to this problem is to make the outer sheath in the form of a braided hose as it is known from ropes and some electro-hydraulic cables. Such a braided hose may e.g. be made from threads comprising polyester fibre, aramide fibre, polyethylene mono-filaments, or metallic filaments. The threads may be spun, twisted or braided into chords or assembled in tapes.

A problem with the braiding of an outer sheath for a flexible pipe is that the circumferences of typical flexible pipes are much larger than those of even large ropes (e.g. for anchors) and cables, and which therefore require very large machines compared to those of the rope and cable industry. Further, the velocity of the braiding process is considerably lower than what is typical for winding processes in connection with the manufacture of flexible pipes and therefore not easily integrated in a normal manufacturing flow.

DISCLOSURE OF INVENTION

The object of the present invention is to provide a flexible pipe with an outer protective sheath that allows a radial expansion and contraction of armouring layers of the pipe. It is a further object to provide a solution which can be produced in a simple and cost effective way.

The objects of the invention are achieved by the invention described in the accompanying claims and as described in the following.

The flexible pipe of the invention thus has shown to provide good properties with respect to radial expansion and contraction and simultaneously it may in some embodiments be obtainable using a process which is compatible with other processes normally used for the manufacturing of a flexible pipe.

Furthermore the flexible pipe of the invention may in one embodiment provide a solution wherein aggressive gases are capable of diffusing out through the liner preferably so that such gasses are not accumulated in the volume around the armouring profiles.

The flexible pipe of the invention for transporting a fluid in a marine environment, the pipe comprises a) a liner for confining the fluid to be transported by the pipe, b) an armouring layer surrounding the liner, c) an outer protective sheath surrounding the armouring layer wherein said outer protective sheath comprises at least two protective layers of helically wound composite wires, said at least two layers being wound with essentially opposite winding angles and being locally held together.

A flexible pipe according to the invention may further comprise other layers such as a carcass, two or more armouring layers (tensile as well as pressure armouring layers in the form of short or long pitch helically wound wires or strips or webs as well as polymer sheaths), one or more intermediate layers or coatings (e.g. for sealing or mechanical or corrosive protection of other layers), one or more anti-corrosive, anti fouling, etc., such as e.g. disclosed in WO-A1-03/019064, WO-A1-02/01104, U.S. Pat. No. 6,085,798 and U.S. Pat. No. 5,269,349 which—with respect to these specific layers—are incorporated herein by reference.

A flexible pipe for transporting a fluid substance, e.g. oil or gas, has an inside which is in contact with the fluid substance during operation and an outside which is in contact with the environment, e.g. a marine environment. In the present context, the term 'an outer surface' of an element in a flexible pipe (e.g. a liner or any other layer) is taken to mean a surface that faces towards the outside (as opposed to towards the inside) of the flexible pipe (not necessarily having a direct contact to the environment, though). Similarly the term 'an inner surface' of an element in a flexible pipe is taken to mean a surface that faces towards the inside of the flexible pipe (not necessarily having a direct contact to the fluid to be transported by the pipe).

In the present context, the term 'composite' is used to indicate that the element in question comprises several parts (e.g. a wire comprising a number of identical or different chords, each chord possibly being a composite element, etc.), e.g. parts of different atomic structure, different chemical composition or e.g. a matrix of a given material comprising enclosed elements of another material (e.g. a thread comprising elongate fibres in a background matrix material) or a layered material comprising distinct layers of different or identical materials in a sandwich structure (e.g. including a binding material). The composite nature of a wire (and possibly the constituents of the wires, e.g. chords), being of a predominantly un-bonded nature, makes the wire and the resulting layer made from the wires permeable to water.

In one embodiment no additional water tight layer or layers is applied between the armour layer and the outer protective sheath or covering the outer protective sheath, whereby the aggressive gases which are capable of diffusing out through the inner liner are not accumulated in the volume around the armouring profiles.

In the present context, the term 'permeable to water' is taken to mean that the water of the marine environment in which the flexible pipe is deployed is able to penetrate through the element in question, e.g. the outer protective sheath, and come into contact with underlying elements, e.g. layers such as armouring layers. In an embodiment of the invention each layer of the outer protective sheath has a water flow velocity index through its thickness, as defined in EN ISO 11058 for a water head loss of 50 mm, of 0.1 liter per second per square meter, such as 50 liter per second per square meter, such as 200 liter per second per square meter. In an embodiment of the invention, the outer protective sheath has a coefficient of diffusion for water larger than 10 times that of a thin (e.g. 0.1-2 mm thickness), solid, homogeneous polyethylene polymer layer, such as larger than 100 times, such as larger than 1000 times.

A composite wire may take on various geometrical cross sectional forms, e.g. essentially circular, essentially rectangular or tape formed, essentially trapezoid, essentially forming a parallelogram, essentially elliptical, etc.

In the present context, the term 'a liner for confining the fluid to be transported by the pipe' is taken to mean an enclosing—typically, but not limited to tubular—body where fluid for transportation in the pipe is essentially located inside the body (liner) meaning that the liner surrounds the fluid to be transported by the pipe ('essentially located' indicating that a minor fraction of liquid or gasses may escape by diffusion through the liner wall). In an embodiment of the invention, the flexible pipe has a central, longitudinal axis located inside the liner, the liner having an inner surface facing the interior (the fluid to be transported) and an outer surface facing the exterior (e.g. a marine environment).

In the present context, the term 'essentially opposite winding angles' is taken to mean that adjacent layers are wound with winding angles relative to a longitudinal axis of the flexible pipe that are comparable in absolute value (i.e. in one embodiment equal but at least equal within 20%, in one embodiment at least equal within 10° difference in winding angles) but having opposite sign (e.g. the underlying layer having a winding angle of +40° and the wound layer immediately surrounding the underlying layer having a winding angle of −40°). In an embodiment of the invention, the absolute value of the winding angles of the protective layers are in the range 45°-65°, such as 52°-60°.

In an embodiment of the invention, the flexible pipe comprises a layer in physical contact with the inner surface of the liner (e.g. an inner armouring layer (e.g. in the form of a carcass) or any other relevant layer) in which case the liner is not necessarily in direct physical contact with the fluid to be transported.

In an embodiment of the invention, the at least two layers are locally held together in the sense that the at least two protective layers have adjacent surfaces of contact comprising areas which are held together (e.g. by a chemical or mechanical bond) and areas with are un-tied to each other. i.e. the layers are NOT 100% fixed to each other. On the other hand they are NOT fully un-tied to each other, but something in between.

In an embodiment of the invention, the at least two layers are locally held together in the sense that the layers are held together to provide local fixation of the wires of one layer with respect to the other layer, while allowing for shear deformation between the layers in the un-tied areas of the interface between the layers.

In an embodiment of the invention, the layers are e.g. locally held together by a localized bonding, e.g. implemented by a glue or a heat- or pressure-induced localized melting, distributed on contacting surfaces of two adjacent layers in points or distinct spots or along one or more linear or curved (e.g. helical) paths. Alternatively, the layers may be held together by clamps or interlacing wefts placed at distributed distinct locations thereby tying adjacent layers together.

In other words, 'locally held together' does NOT include a continuous, homogeneous bonding covering the full surface of contact between adjacent layers.

The layers are locally held together to provide fixation of the wires of one layer with respect to the other layer, while allowing for shear deformation between the layers in the non-connected areas of the interface between the layers.

It is an advantage of the invention that a relatively flexible, yet fixed structure of the outer sheath is provided. This is e.g. achieved in that the outer sheath is held together in an array of discrete spots or along linear or curved paths.

The flexibility is maintained because the stiffness in shear in the wires of adjacent protective layers may be made much larger (e.g. 5 to 10 times larger) in the areas being locally held together than outside these areas. This allows a change of angles between the wires of two adjacent layers of the outer protective sheath during elongation or shortening of the pipe.

In an embodiment of the invention, the armouring layers are NOT chemically bonded to the inner liner or to possible intermediate layers or membranes but is able to move relative to this or these layers, thereby improving the flexibility of the pipe. This type of pipe is normally termed an "un-bonded" pipe.

In an embodiment of the invention a water-permeable membrane is placed between the outermost armour layer and the outer sheath, thereby providing protection of the armouring layers during manufacturing, prior to the application of the outer sheath, and also providing a barrier for ingress of fine particles (e.g. sand) from the surrounding environment to the armour layers.

In an embodiment of the invention, a flexible pipe is provided, the flexible pipe comprising an inner liner creating a barrier against leakage of fluid being transported by the pipe, the liner being surrounded by one or more armouring layers, the armouring layers comprising one or more armouring profiles, the armouring layers being surrounded by a thin permeable membrane, the membrane being surrounded by an outer protective sheath which comprises at least two layers wound from one or more wires, the at least two layers being wound with opposite winding angles, the wires comprising chords which are partially (i.e. locally) held together and the wound layers are partially (i.e. locally) held together.

A further advantage of the invention is that the concentration of harmful materials diffusing out through the liner from the interior of the pipe may be held at a level lower than the maximum allowable value for the armouring layer or layers. This is achieved in that the harmful materials are dissolved into the seawater surrounding the armour and subsequently removed from the pipe layers by diffusion due to the difference in concentration relative to the ambient surrounding sea.

Further, if the pipe is used in a marine environment for the transport of fluids at elevated temperatures, the surrounding water aids at ensuring an effective cooling of the armouring layer(s) thereby preventing its damage due to overheating from the fluid transported by the pipe. Also, the armouring layer is protected by the outer protective sheath against seizing, fouling, wear, impact loads and critically large compressive forces.

In an embodiment of the invention, said at least two protective layers are held together by at least one discrete string of binding material located on contacting surfaces of neighbouring protective layers, said string of binding material extending in a longitudinal direction of the flexible pipe and crossing the composite wires of said protective layers. The term 'said string of binding material crossing the composite wires' is taken to mean that the path of the string of binding material crosses the path or the wound composite wires to fix the layers in the 'crossing points'. Such a structure is e.g. especially suitable for resisting external mechanical impacts such as wear, seizing, fouling, point-loading, etc. because—due to the longitudinal extension of the bond or adhesion—individual turns of a wire of a protective layer cannot be displaced relative to each other and thereby exposing underlying layers to such external impacts.

In an embodiment of the invention, the string of binding material forms a continuous linear stripe in an axial direction of the flexible pipe. Alternatively, the string may be segmented and/or follow any other appropriate path along the longitudinal axis of the flexible pipe. In an embodiment of the invention a multitude of strings of binding material are provided between adjacent layers wound with opposite winding angles.

When a multitude of essentially linear and continuous strings of binding material are distributed around the periphery of the contacting surfaces of neighbouring protective layers, it is ensured that the neighbouring layers may be tied to each other in a controlled manner. By changing the 'density' of strings of binding material (e.g. the peripheral distance between adjacent strings) the shear stiffness of the protective sheath may be adjusted to optimize the pipe structural behaviour. Further, the permeability of the protective layers may be changed.

In an embodiment of the invention, 2 or more strings of binding material are provided, such as 5 or more such as 10 or more. In an embodiment of the invention, the strings of binding material are evenly distributed along the periphery of the neighbouring protective layers (when viewed in a cross section perpendicular to a longitudinal direction of the flexible pipe). In an embodiment of the invention, the distance on the surface periphery between individual strings of binding material in a cross section perpendicular to a longitudinal axis of the pipe is between 1 and 15 cm, such as between 3 and 10 cm. In an embodiment of the invention, the distance on the surface periphery between individual strings of binding material in a cross section perpendicular to a longitudinal axis of the pipe corresponds to an angle in the range between 10 and 60 degrees when viewed from the centre of the cross section.

In the present context, the term 'binding material' is taken to mean any adhesive such as glue (e.g. silane-, epoxy-, or urethane based) or thermoplastic materials (e.g. materials such as polyvinylalcohol or polyethylene) or cement (e.g. acrylates) that are able to make two protective layers adhere to each other along the extension of the binding material.

When said binding material is chosen from the group hot melt adhesive, thermoplastic polymer, cross linked polymer adhesive, vulcanizing paste, it is ensured that the elasticity and ductility of the bond can be optimised with respect to pipe structural behaviour.

When said composite wires comprise a number of chords, at least one of said chords being locally linked to at least one neighbouring chord, it is ensured that the neighbouring chords may be tied to each other in a controlled manner thereby controlling the shear stiffness of the wire. By changing the 'density' of 'links' the permeability of the wire may be changed.

In the present context, the term 'locally linked' is taken to mean that chords are held together at distinct spots or along a distinct linear or curved path, e.g. 1) 'chemically' by being bonded to each other, e.g. by being glued or melted or compressed together or 2) 'mechanically' by clamps or interlacing wefts placed at distributed distinct locations.

In the present context, the term 'neighbouring chord' is taken to mean a chord that is located adjacent to the chord in question at least over a certain length of its longitudinal extension. In an embodiment of the invention, neighbouring chords touch each other. In an embodiment of the invention, neighbouring chords of a given chord are taken to be all chords located fully or partly within a radial distance of the largest cross sectional dimension of the chord in question from the centre of the chord in question, when viewed in a cross section perpendicular to a longitudinal axis of the chord. In an embodiment of the invention, neighbouring chords of a given chord are taken to be the 6 nearest neighbouring chords, such as the 4 nearest neighbouring chords, such as the 2 nearest neighbouring chords, such as the nearest neighbouring chord, as given by the distance from the centre of the chord in question to a surface of a neighbouring chord, when viewed in a cross section perpendicular to a longitudinal axis of the chord.

In an embodiment of the invention, preferably all of the chords of a particular composite wire are locally linked to at least one and preferably all neighbouring chords.

In an embodiment of the invention, the local linking of neighbouring chords is arranged to provide a predefined permeability for water (at a certain hydrostatic pressure difference between the inner and outer surfaces of the layer in question). The permeability is achieved (and controlled) by the composite nature of the wire (e.g. comprising twisted chords) and the angled structure of neighbouring protective layers being locally held together (i.e. yielding a combination of fixed and un-bound parts of the contacting surfaces of neighbouring outer protective layers).

In an embodiment of the invention, a wire comprises two or more chords, such as 3 or 4 or 5 chords. In an embodiment of the invention, the number of chords of a wire is in the range 5-100, such as 20-50. In an embodiment of the invention, the chords of a wire are distributed in one or more layers.

In an embodiment of the invention, the chords are fully or partially composed of a thermoplastic polymer.

In an embodiment of the invention, at least one chord is linked to at least one neighbouring chord along their adjacent longitudinal surface.

In an embodiment of the invention, at least one chord is fully or partially melted to at least one neighbouring chord along their adjacent longitudinal surface. 'Partially melted along their adjacent longitudinal surface' is taken to mean that adjacent wires are not melted together continuously in the meaning that e.g. a length of two neighbouring chords is alternately melted together and NOT melted together (i.e. segmented). Thereby a further design parameter for the permeability of the resulting wire is provided by controlling the lengths and distribution (periodic or non-periodic) of the bonded and non-bonded parts.

In an embodiment of the invention, a chord comprises a number of threads. In an embodiment of the invention, a chord comprises two or more threads, such as 4 or more threads. In an embodiment of the invention, the threads are twisted to form a helical path around a longitudinal axis of the chord. In an embodiment of the invention, the threads are twisted around a central longitudinal element to form a helical path around a longitudinal axis of the chord. In an embodiment of the invention, at least one thread comprises a thread binding material, such as a glue or cement or thermoplastic material.

When each chord comprises a number of threads twisted around a longitudinal axis of the chord and at least one of said threads comprise a thread binding material, it is ensured that a convenient way of controlling the distribution and density of the local links is provided. By varying the total number of chords and/or the number of chords comprising a thread binding material, the shear stiffness and/or the permeability of the resulting wire may be controlled.

When said threads are twisted around a central element, it is ensured that the design freedom regarding mechanical properties of the chords and thus the wire is improved.

When said central element comprises filaments of a metallic material such as copper or a copper alloy, it is ensured that growth of marine species, such as algae, is suppressed, while still adding mechanical strength to the chord.

In a preferred embodiment, a flexible pipe is provided, the pipe comprising an inner armouring layer preventing the surrounding inner liner to collapse due to an outer excess pressure, the inner liner being surrounded by a wound armouring layer, the armouring layer being surrounded by an outer protective sheath in the form of at least two wound protective layers, the protective layers being wound from at least one tape-formed wire at opposite winding angles, the wire(s) comprising twisted chords comprising thermoplastic polymer filaments, the chords being constructed around a metallic filament core, the chords being longitudinally melted together to a tape-formed wire, the wound layers being locally bonded together by applying longitudinal discrete strings of a glue between the layers.

When said chords constitute a tape-formed wire, it is ensured that a convenient form of wire appropriate for the winding of a homogeneous layer is provided. Further, the links between chords aid in preventing wear and tear of a protective sheath made from such wires, and thereby lowers the risk of exposing the armour layers to these conditions.

When said thread binding material is chosen from the group of materials thermoplastic polymers such as polyolifin, polyurethane, rubbers that may be vulcanized, it is ensured that strong, flexible and ductile links are provided between chords.

When said threads comprise a number of fibres or filaments, parameters such as permeability (open/un-bonded structure), strength, flexibility, wear resistance, weight and price may be controlled.

In an embodiment of the invention, a filament comprises a set of continuous or discontinuous fibres assembled, e.g. woven, twisted, spun or entangled in each other.

In an embodiment of the invention, a thread comprises more than 6 filaments, such as more than 25, such as more than 50. In an embodiment of the invention, a thread comprises more than 1000 fibres per $mm^2$, such as more than 10000 per $mm^2$ such as more than 100000 per $mm^2$.

When said fibres or filaments are chosen from the group of materials polyester, aramide, polyethylene, titanium, copper, it is achieved that parameters such as strength, flexibility, wear resistance and weight of a thread (and thereby indirectly a resulting chord and wire) may be tailored.

When said fibres or filaments are fully or partially protected by a jacket, a coating or an impregnation, it is ensured that wear and environmental resistance may be optimised for certain types of fibres, making it possible to use a broader range of materials.

In an embodiment of the invention, the continuous or discontinuous fibres or filaments are assembled by twisting or spinning.

The permeability for water of the outer protective layers of the outer protective sheath is governed by the discrete assembly of the wires used for winding the outer protective layers, the wires e.g. comprising chords, threads, filaments/fibres, the wires or constituents of the wires being held together by local links comprising localized spots or areas being bonded together or spun together or entangled in each other or mechanically held together in other ways.

The wire may in principle be produced using any method, but for providing a simple and cost effective method the following method of the invention may be desired.

The method of manufacturing a flexible pipe for transporting a fluid in a marine environment according to the invention comprises the steps of a) providing a liner for confining the fluid to be transported by the pipe, b) providing an armouring layer surrounding the liner, c) providing an outer protective sheath surrounding the armouring layer is furthermore provided by the present invention. When step c) comprises the substeps of c1) providing a composite wire, and c2) providing at least two protective layers, each layer being arranged by helically winding at least one of said composite wires, said at least two layers being wound with essentially opposite winding angles and being locally held together, it is ensured that a relatively flexible, yet fixed structure of the outer sheath is provided cf. the above description of a flexible pipe according to the invention.

When in step c2) at least one discrete string of binding material is applied to the contacting surfaces of neighbouring protective layers, said string of binding material being arranged to extend in a longitudinal direction of the flexible pipe and to cross the composite wires of said protective layers, it is ensured that the neighbouring layers may be tied to each other in a controlled manner, thereby providing a means for controlling the shear flexibility of the outer protective layers.

When step c1) comprises the sub-steps of c1-1) providing a number of chords, and c1-2) arranging said chords to a wire so that at least one of said chords is locally linked to at least one neighbouring chord, it is ensured that the neighbouring chords may be tied to each other in a controlled manner, thereby providing a means for controlling the shear flexibility of the wire and thus the outer protective layers.

In a preferred embodiment of the invention, step c1-1) comprises the sub-steps of c1-1-1) providing a number of threads wherein at least one thread comprises a binding material, and c1-1-2) arranging said threads to a cord, thereby providing a method for tying neighbouring chords to each other.

In an embodiment of the invention, in step c1-1-2) said threads are twisted around a longitudinal axis of the chord, thereby providing a flexible and wear resistant structure.

When step c1-1-1) comprises the sub-step of providing a central element and in step c1-1-2) said threads are wound around said central element, it is ensured that the design freedom regarding mechanical properties of the chords and thus the wire is improved.

When step c1-2) comprises the step of arranging a binding material between adjacent longitudinal surfaces of said neighbouring chords, it is ensured that neighbouring chords are connected to each other, while maintaining the inherent flexibility of the chords.

When step c1-2) comprises the step of arranging adjacent longitudinal surfaces of said neighbouring chords to be fully or partially melted together, it is ensured that neighbouring chords made from a thermoplastic material are tied efficiently to each other, while maintaining the inherent flexibility of the chords.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 6 shows a schematic composition of a wire for use in the winding of layers of an outer protective sheath, FIG. 7 shows cross sections of various embodiments of a wire according to the invention, FIG. 7.a and FIG. 7.b illustrating a wire with a substantially rectangular cross section and a substantially trapezoid cross section, respectively, and FIG. 8 shows an embodiment of a tape for use in the winding of layers of an outer protective sheath, FIG. 8.a being a top view of a tape and FIG. 8.b being a cross sectional view.

The figures are schematic and simplified for clarity, and they just show details which are essential to the understanding of the invention, while other details are left out. Throughout, the same reference numerals are used for identical or corresponding parts.

MODE(S) FOR CARRYING OUT THE INVENTION

Figure 1:
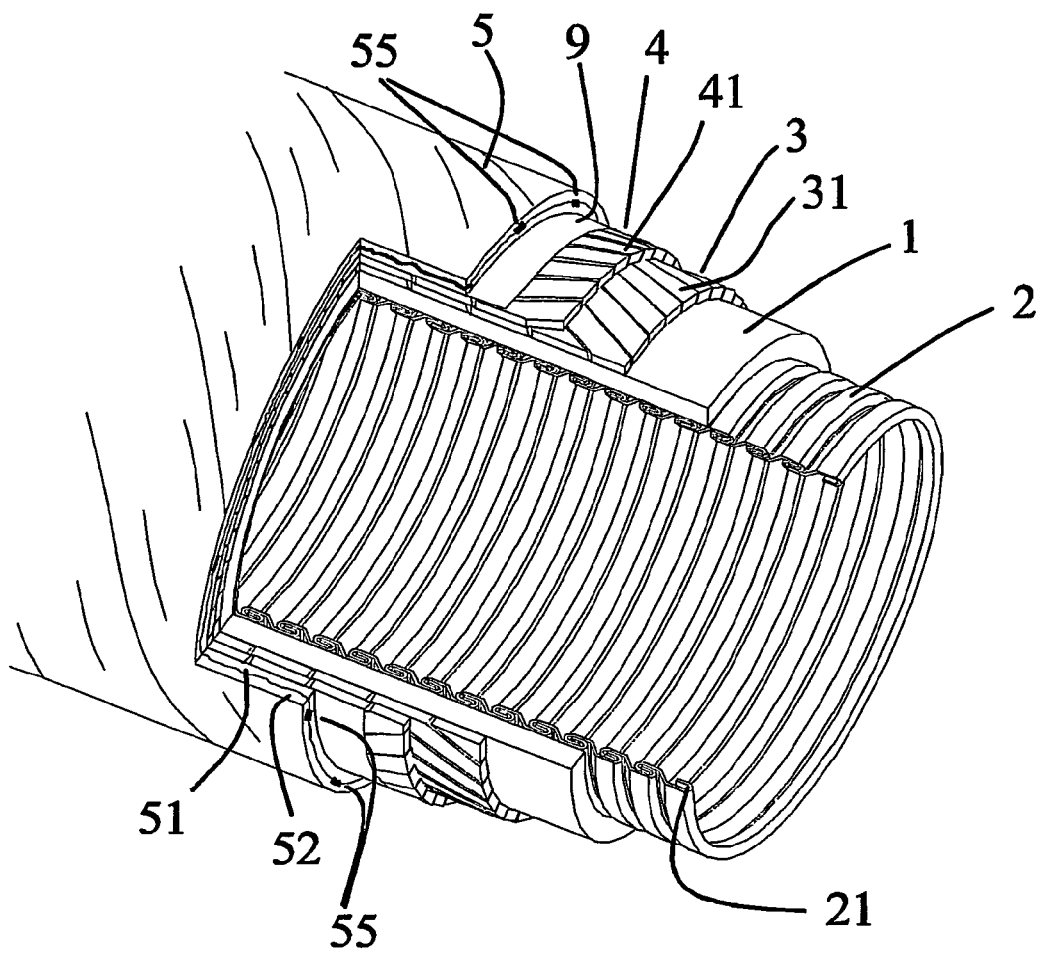
FIG. 1 shows a perspective view with a cut-out of an embodiment of a flexible pipe according to the invention illustrating various layers of the pipe.

FIG. 1 shows a perspective view with a cut-out of an embodiment of a flexible pipe according to the invention illustrating various layers of the pipe.

In FIG. 1, an inner barrier liner 1 is shown surrounding an (optional) inner armouring layer 2. The purpose of the inner armouring layer is to prevent a collapse of the inner liner in case the pressure difference between its inner and outer surface exceeds the value which the liner itself is able to withstand. The inner armouring layer 2 comprises a metal tape 21 that is helically wound to create an inner tube. The metal tape is—during the winding process—provided with flaps that are intertwined thereby locking individual turns of the tape to each other in such a way that the inner armouring layer 2 is capable of being deflected out of its longitudinal direction. While the inner armouring layer is not inherently tight, the surrounding inner liner 1 has the purpose of fully or partially preventing the escape of liquid or gas from the interior of the tube out into the surrounding armouring layers.

Although shown in FIG. 1 as a separate unit, the liner 1 may of course be a more or less integrated part of the above mentioned inner armouring layer 2. The metal tape 21 constituting the inner armouring layer 2 may typically be made of stainless steel, although other metal alloys and pure metals may be used. The liner 1 may be made of a thermoplastic material, typically chosen from the group polyamide, polyolifine, polyketone or polyvinylidene fluoride (PVDF), although many other materials may be used. A flexible pipe without an inner armouring layer may be used for certain applications, e.g. in connection with the pumping of water back into an oil well to replace the extracted oil. The liner may be constructed as one layer or consist of more than one layer of e.g. polymers, which may be successively extruded on a previous layer, the individual layers having identical or different properties.

One or more layers 3, 4 of armouring profiles 31, 41 are helically wound around the inner liner 1. The armouring profiles constitute turns either with a small pitch length (such as winding or pitch angles in the range around 80-90°) relative to the longitudinal direction of the pipe, or as shown in FIG. 1 with a larger pitch length (such as winding or pitch angles in the range around 65-30°). In FIG. 1, two armouring layers 3, 4 wound with opposite winding angles are shown. In such a case it is preferable that the armouring profiles 31, 41 of the respective layers have a winding angle with the longitudinal axis of the pipe in the range 50 to 60° (i.e. e.g. +55° and −55°, respectively).

The 'pitch length' is in the present context defined as the distance in the longitudinal direction of the pipe between end points of a path following the centre axis of an armouring profile along a single peripheral (2π) turn. The winding or pitch angle of a wound element (e.g. a wire) is the angle between a longitudinal axis of the pipe and a projection of the centre axis of the wound element in a plane comprising the longitudinal axis of the pipe.

The turns of the armouring profiles create a resistance against the disruption of the pipe due to a high positive pressure difference between the inner and outer surface of the liner and additionally absorb possible tensile forces on the pipe. To ensure a flexibility of the armouring layers, the armouring profiles may be constructed to inherently comprise a certain expansion space.

One or more other layers may be provided between the armouring layers, such other layer or layers having e.g. the purpose of preventing tearing and wear between adjoining armouring profiles when the pipe is being bent.

The armouring profiles 31, 41 may be made of a variety of materials having sufficient strength to ensure the function of the pipe. Considering that the armouring profiles 31, 41 of a flexible pipe according to the invention are fully or partially exposed to the surrounding environment (e.g. a marine environment comprising salt water), it is advantageous to choose materials that are not degraded by the environment.

For use in sea water, armouring profiles made of fibre-reinforced polymers or alloys based on titanium are especially suitable.

In a preferred embodiment, the armouring profiles are made of prefabricated tapes which are assembled to profiles during the winding process so that the profiles are essentially free of mechanical stress due to the winding.

In the embodiment of FIG. 1, the armouring layers 3, 4 are surrounded by a water permeable membrane 9, which during manufacturing aids in protecting the armouring layers and during operation provides a barrier against fine particles (being carried by the water around the pipe) from intruding into the armouring layers. The membrane, e.g. being created by winding wires with substantial overlap, may preferably be made from a needle-punched non-woven textile, but also woven textiles and felts may be suitable.

The permeable membrane 9 is surrounded by an outer protective sheath 5, which comprises at least two wound layers 51, 52 having essentially opposite winding angles and which are being locally held together (e.g. by one or more strings 55 of binding material).

Figure 2:
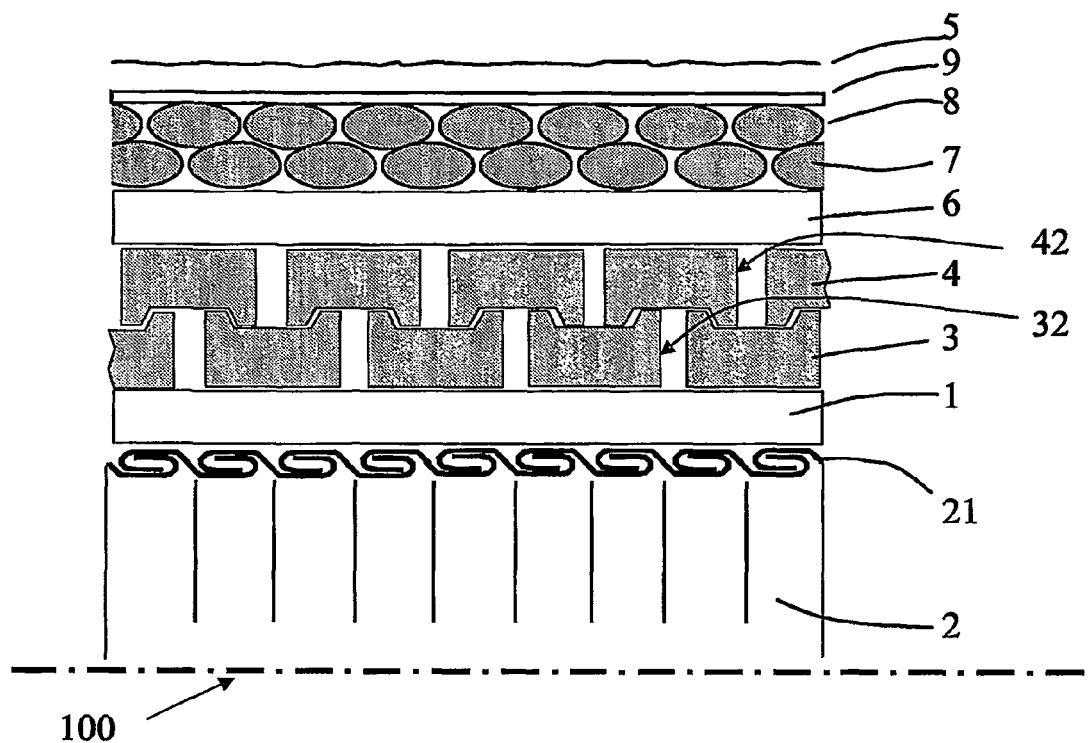
FIG. 2 shows a cross sectional view of various layers of an embodiment of a flexible pipe according to the invention.

FIG. 2 shows a cross sectional view of various layers of an embodiment of a flexible pipe according to the invention. The cross sectional view is taken in a longitudinal direction 100 of the flexible pipe. The features of FIG. 2 that are referred to in FIG. 1 with identical reference numerals represent features having the same or corresponding function and are not necessarily discussed in connection with FIG. 2.

Compared to the pipe of FIG. 1, the armouring layers 3, 4 of the embodiment in FIG. 2 wound directly on the inner liner 1 comprise turns with a relatively small pitch (e.g. corresponding to a winding angle of 87°) in the longitudinal direction 100 of the pipe and hence will primarily absorb radial loads originating from inner pressures. Such an armouring or such a layer is therefore often termed a pressure armouring (layer). As seen in the figure, the profiles used in this type of armouring layer 3, 4 may be C-formed profiles 32, 42. The profiles of each armouring layer 3, 4 may be oriented relative to each other to interlock (as illustrated in FIG. 2), the two layers being wound around the liner in the same direction (i.e. having essentially identical winding angles). Alternatively, other types of profiles such as Z- or X- or T-formed profiles and tapes may be used.

Many different materials may be used for the manufacture of the armouring profiles 32, 42. Typically metals are used, preferably carbon steel.

Around the pressure armouring layers 3, 4, an intermediate sheath in the form of a tight membrane 6 is provided in the embodiment in FIG. 2. The purpose of the membrane 6 is to prevent the ingress of fluids from the surrounding environment to the pressure armouring layers 3, 4. This is important for the embodiment of a flexible pipe shown in FIG. 2 because all layers outside the intermediate sheath 6 are essentially exposed to the surrounding environment. The tight membrane 6 thus has to function as a transport barrier between the surrounding environment and the pressure armouring 3, 4. The tight membrane—e.g. made by extrusion of a thermoplastic material—is essentially liquid tight. The membrane may preferably be made of a material from the group polyamide, polyolifine or polyketone, although many other plastic materials and combinations thereof may be appropriate too. The membrane may be constructed as one layer or consist of more than one layer of e.g. polymers, which may be successively extruded on a previous layer, the individual layers having identical or different properties.

Around the tight membrane 6, an additional armouring layer 7, 8 is arranged. The armouring layer 7, 8 comprises one or more layers of profiles or tapes that are helically wound with a substantially higher pitch than the above mentioned pressure armouring profiles 3, 4. The armouring constituted by these wound profiles or tapes are—for the shown type of pipe—in the following termed a 'tensile armouring'. By winding with a large pitch (e.g. corresponding to a winding angle around 35°) it is ensured that the tensile armouring is capable of absorbing tensile forces in the longitudinal direction 100 of the flexible pipe. Such tensile forces may e.g. be imposed during laying or operation of the flexible pipe.

To ensure a flexibility of the pipeline, the individual tensile armouring profiles are typically arranged to provide a play between the turns.

Between the above mentioned armouring profiles 7, 8 one or more other layers may optionally be arranged, such other layer or layers having e.g. the purpose of preventing tearing and wear between adjoining armouring profiles when the pipe is being bent. The tensile armouring profiles may be made of a variety of materials as discussed in connection with the armouring profiles of with FIG. 1.

In the embodiment of FIG. 2, protection of the tensile armouring 7, 8 and the pipeline in general is provided by applying a permeable membrane 9, and an outer sheath 5. The permeable membrane may (alternatively to the embodiment described in FIG. 1) be made of an extruded thermoplastic material which is perforated either during or after its manufacture or of a braided material or a woven or non-woven textile. The outer sheath comprises at least two (here two is shown) oppositely wound adjacent layers which are locally bonded to each other, i.e. e.g. bonded in discrete points or spots or along a linear or curved path.

Figure 3:
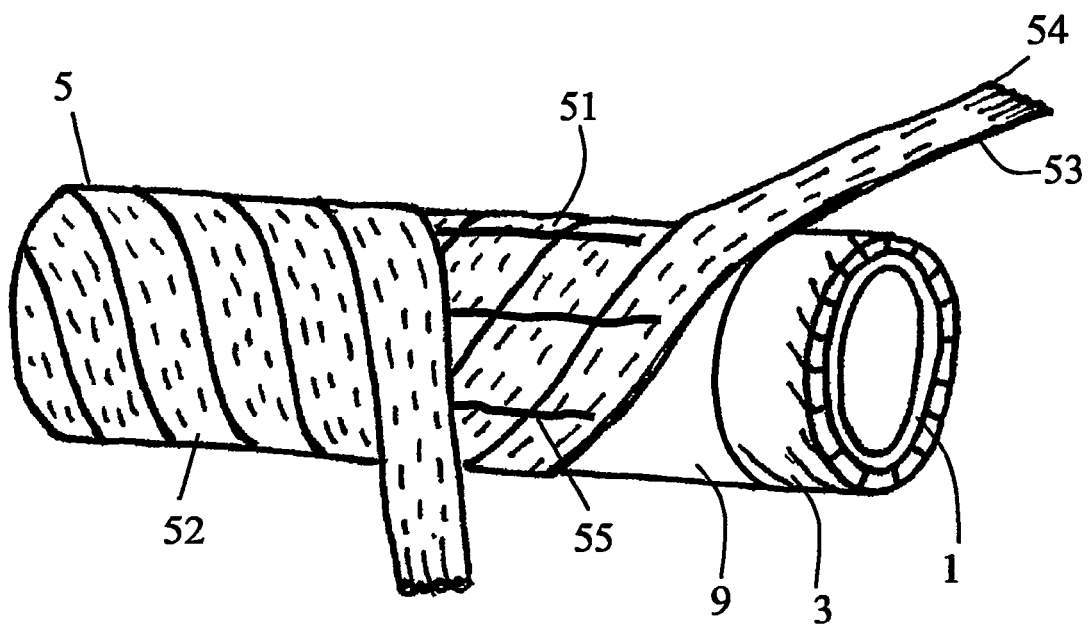
FIG. 3 shows a schematic perspective view of an embodiment of a flexible pipe according to the invention illustrating the winding of wires and bonding of layers of an outer protective sheath.

FIG. 3 shows a schematic perspective view of an embodiment of a flexible pipe according to the invention illustrating a method of manufacturing a flexible pipe according to the invention, specifically the winding of wires and bonding of layers of a protective outer sheath.

An expedient method of manufacturing an outer protective sheath 5 is shown in FIG. 3. Two protective layers 51, 52 of helically wound tape-formed wires 53 are wound with opposite winding angles around a permeable membrane 9 surrounding an armouring layer 3, the armouring layer 3 again surrounding a liner 1. The layers 51, 52 are constructed from at least one wire 53, the wire comprising a number of chords 54, which—depending on the actual composition of the material (e.g. in the form of fibres) constituting the chords—are locally (i.e. partly) bonded together e.g. by a thermoplastic hot melt adhesive (such as poly vinyl alcohol or polyethylene or compounds thereof) or just melted together (the latter in case the chord material comprises a thermoplastic material). During winding of the outermost protective layer 52, strings 55 of glue (e.g. based on polyurethane) are added to the underlying protective layer 51. Instead of a glue, a melted thermoplastic polymer, a vulcanizing paste or other curing glue may be used.

Figure 4:
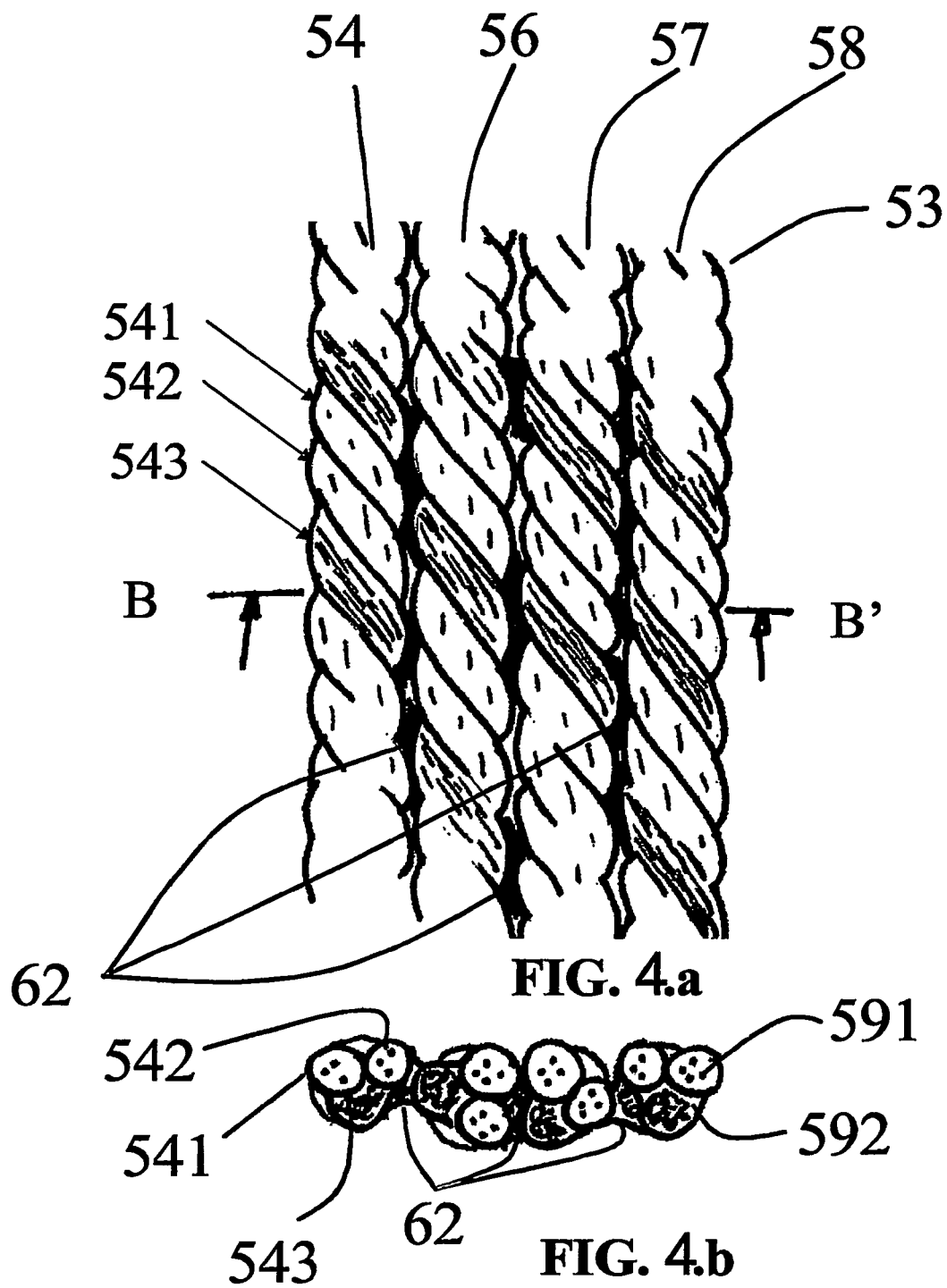
FIG. 4 shows an embodiment of a wire for use in the winding of layers of an outer protective sheath, FIG. 4.a being a top view and FIG. 4.b a cross sectional view.

FIG. 4 shows an embodiment of a wire for use in the winding of layers of an outer protective sheath, FIG. 4.a being a top view and FIG. 4.b a cross sectional view.

FIG. 4.a shows a tape-formed wire 53 comprising 4 chords 54, 56, 57, 58. A cross section of the wire 53 taken along the line BB' is shown in FIG. 4.b. Each chord comprises at least two and (as here) preferably three threads as exemplified for the chord 54 by the threads 541, 542, 543. In the embodiment of FIG. 4, at least one (her one is shown) of the threads is impregnated with or surrounded by a binding agent 592 which ties the individual filaments 591 of a thread together and additionally the chords 54, 56, 57, 58 together to a tape-formed wire 53 in a localized (i.e. distributed or scattered) manner, as indicated in FIG. 4.a by reference numeral 62. The threads 541, 542, 543, may e.g. comprise polyester fibre, aramide fibre, polyethylene mono-filaments or mixtures thereof, but many other types of fibre and filaments may be used, including metallic ones comprising e.g. titanium or copper. The fibres or filaments may be individually, fully or partially protected by a jacket, a coating or an impregnation depending on their type and use. The binding agent may be a thermoplastic polymer, e.g. of the type polyolifin, polyurethane or other fusible polymers. Many other types of binding agents may be used, e.g. rubbers that may be vulcanized.

The localized bonding of the wire may be provided by other combinations and ways of tying the individual threads 541, 542, 543 and/or filaments 591 together, e.g. by braiding or clamping to chords 54, 56, 57, 58 or by braiding to a complete wire, 53.

Figure 5:
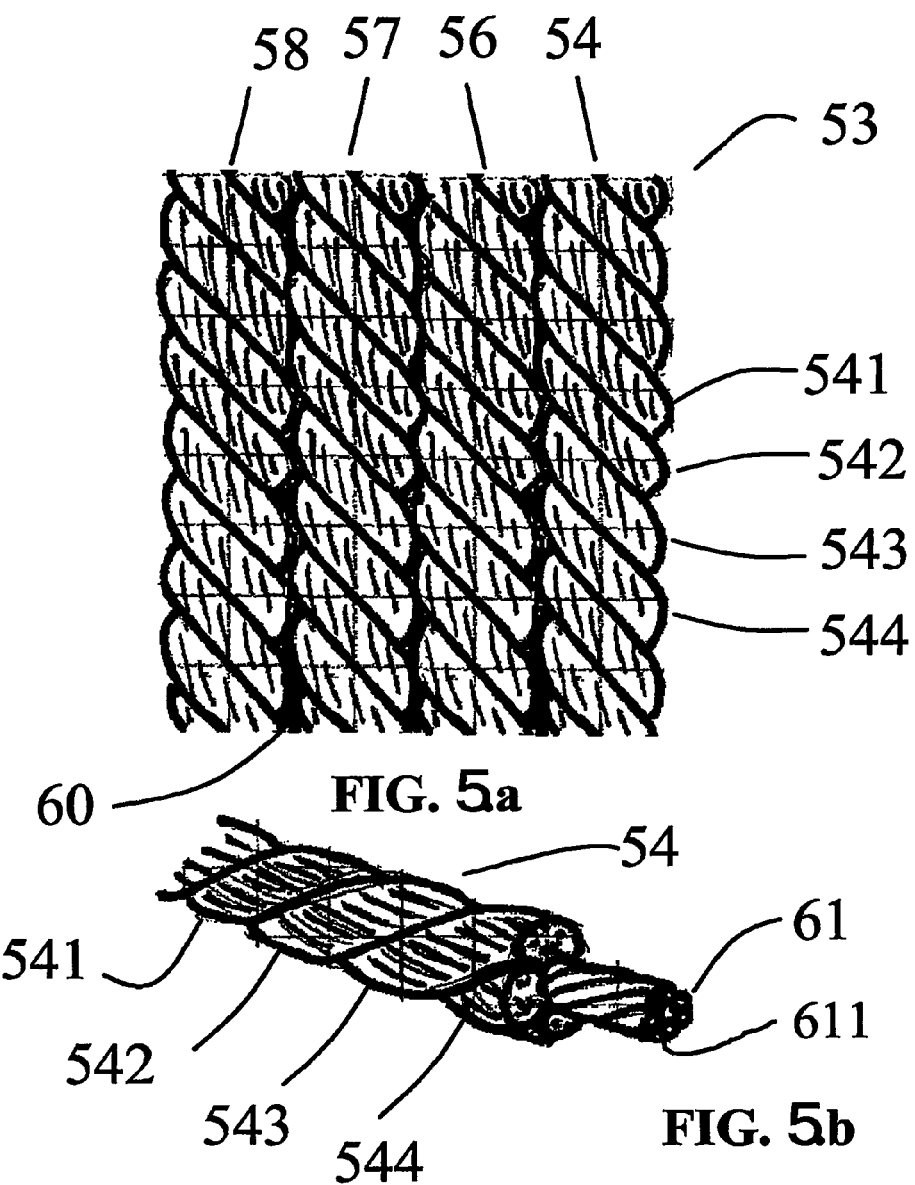
FIG. 5 shows an embodiment of a wire for use in the winding of layers of an outer protective sheath, FIG. 5.a being a top view of a wire and FIG. 5.b a perspective view of one of the chords of the wire.

FIG. 5 shows an embodiment of a wire for use in the winding of layers of an outer protective sheath, FIG. 5.*a* being a top view of a wire and FIG. 5.*b* a perspective view of one of the chords of the wire.

The wire 53 of FIG. 5.*a* comprises 4 chords 54, 56, 57, 58 which are melted together along their contacting surfaces 60. As shown in FIG. 5.*b*, an individual chord 54 of the embodiment shown comprises 4 threads 541, 542, 543, 544 which are twisted around a central element or core 61. The central element 61 comprises in a preferred embodiment filaments 611 made of copper or a copper alloy. Other materials, metallic as well as non-metallic, may be used as a core 61 of the chord 54.

FIG. 6 shows a schematic composition of a wire for use in the winding of layers of an outer protective sheath. The wire 53 of FIG. 6 is tape-formed and comprises 4 chords 54, each chord comprising 3 threads 541 and each thread comprising a number of filaments 591. The number of chords and threads, respectively, may of course take on other convenient values, such as 5-10 and 3-8, respectively. In other embodiments of the invention a wire may appropriately comprise 5-20 chords, a chord 3-12 threads and a thread 15-50 filaments or 50-100.000 fibres.

In an embodiment of the invention, the wires used for the winding of protective layers of an outer protective sheath are implemented as described in U.S. Pat. No. 6,165,586. U.S. Pat. No. 6,165,586 deals with a flexible flat strip and its use, in particular for reinforcing flexible ducts. The flexible strip comprises 1) a layer of filamentary rovings arranged in a substantially rectangular cross section, 2) retaining means for surrounding and clamping the layer of rovings and 3) a binding material to bind the retaining means to the layer. The filamentary rovings may e.g. consist of a set or group of continuous threads twisted or not twisted together each thread being capable of being a monofilament or a set of continuous or discontinuous fibres or filaments assembled, in particular, by twisting or spinning.

FIG. 7 shows cross sections of various embodiments of a wire according to the invention, FIG. 7.*a* and FIG. 7.*b* illustrating a wire with a substantially rectangular cross section and a substantially trapezoid cross section, respectively. In FIG. 7 the wires 53 are shown to be tape formed and to consist of two layers of chords 54. The wires may, however, take other forms (e.g. ellipsoid) and comprise 3 or more layers of chords. In an embodiment of the invention, more than one of the trapezoid formed wires of FIG. 7.*b* are used in combination to wind a particular outer protective layer so that adjacent wires are twisted 180° to make their neighbouring edges match, thereby providing a homogeneous layer with no need for overlap of the individual wires. A similar effect may be achieved (without twisting adjacent wires) by wires having a cross section forming a parallelogram, cf. FIG. 8.

FIG. 8 shows an embodiment of a tape formed wire for use in the winding of layers of an outer protective sheath, FIG. 8.*a* being a top view of a tape and FIG. 8.*b* being a cross sectional view. In FIG. 8.*a* a wire 53 in the form of a tape is shown and a cross section taken along the line CC' is shown in FIG. 8.*b*. The tape consists of non-woven thermoplastic fibres 531 being fused and bonded in cross-over touch points 532. The fibres may be entangled in each other as well 533 (cf. FIG. 8.*b*). In an embodiment of the invention, the permeability of the tape is adjusted by punching holes 534 though the tape in its thickness direction (i.e. perpendicular to the view of FIG. 8.*a*). Such holes are preferably less than 100 μm in diameter, such as 50 μm, such as 10 μm.

The invention is defined by the features of the independent claim(s). Preferred embodiments are defined in the dependent claims.

Some preferred embodiments have been shown in the foregoing, but it should be stressed that the invention is not limited to these, but may be embodied in other ways within the subject-matter defined in the following claims. For example, by combining different types of wires, as mentioned herein or other types in the sub-layers of the outer protective sheath.

The invention claimed is:

1. A flexible pipe for transporting a pressurized fluid in a marine environment, the pipe comprising an inner liner for confining the fluid to be transported by the pipe, a two or more armouring layers surrounding the liner, and an outer protective water permeable sheath surrounding the armouring layer, wherein the two or more armouring layers comprises at least two armouring layers wound with opposite winding angles, said outer protective sheath comprises at least two protective layers of helically wound composite wires, said at least two layers being wound with essentially opposite winding angles and being locally held together, and wherein the armouring layers are not chemically bonded to the inner liner or to possible intermediate layers or membranes but are able to move relative to the inner liner or the possibly intermediate layers or membranes, and wherein no additional water tight layer or layers are covering the outer protective sheath.

2. A flexible pipe according to claim 1 wherein said at least two protective layers have adjacent surfaces of contact comprising areas which are held together and areas which are un-tied to each other.

3. A flexible pipe according to claim 2 wherein said at least two protective layers are locally held together to provide local fixation of the wires of one layer of the at least two protective layers with respect to another layer of the at least two protective layers, while allowing for shear deformation between the protective layers in areas of said adjacent surfaces that are un-tied to each other.

4. A flexible pipe according to claim 2, wherein said at least two protective layers are held together by a localized bonding implemented by a glue or a heat- or pressure-induced localized melting, distributed on said adjacent surfaces of contact.

5. A flexible pipe according to claim 2 wherein said at least two protective layers are held together by at least one discrete string of binding material located on said adjacent surfaces of contact, said string of binding material extending in a longitudinal direction of the flexible pipe and crossing the composite wires of said protective layers.

6. A flexible pipe according to claim 5 wherein multitude of essentially linear and continuous strings of binding material are distributed around the periphery of the contacting surfaces of adjacent protective layers.

7. A flexible pipe according to claim 5 wherein said binding material is chosen from the group consisting of hot melt adhesive, thermoplastic polymer, cross linked polymer adhesive, and vulcanizing paste.

8. A flexible pipe according to claim 1 wherein said composite wires comprise a number of chords, at least one of said chords being locally linked to at least one neighbouring chord.

9. A flexible pipe according to claim 8 wherein said chords constitute a tape-formed wire.

10. A flexible pip according to claim 8 wherein said at least one chord linked to said at least one neighbouring chord along their adjacent longitudinal surface.

11. A flexible pipe according to claim 10 wherein said at least one chord is fully or partially melted to said at least one neighbouring chord along their adjacent longitudinal surface.

12. A flexible pipe according to claim 8 wherein each chord comprises a number of threads twisted around a longitudinal axis of the chord and at least one of said threads comprise a thread binding material.

13. A flexible pipe according to claim 12 wherein said thread binding material is a material chosen from the group of thermoplastic polymers, and rubbers that may be vulcanized.

14. A flexible pipe according to claim 12 wherein said threads comprise a number of fibres or filaments.

15. A flexible pipe according to claim 14, wherein said fibres or filaments are of a material chosen from the group of polyester, aramide, polyethylene, titanium, and copper.

16. A flexible pipe according to claim 14 wherein said fibres or filaments are fully or partially protected by a jacket, a coating or an impregnation.

17. A flexible pipe according to claim 12, wherein said threads are twisted around a central element.

18. A flexible pipe according to claim 17 wherein said central element comprises filaments of a metallic material such as copper or a copper alloy.

19. A flexible pipe according to claim 1 wherein a water-permeable intermediate layer is located between said armouring layer and said outer protective sheath.

20. A method of manufacturing a flexible pipe of claim 1, the method comprising: providing an inner liner for confining the fluid to be transported by the pipe; providing an armouring layer surrounding the liner; and providing an outer protective sheath surrounding the armouring layer, comprising providing a composite wire, and providing at least two protective layers, each layer being arranged by helically winding at least one of said composite wires, said at least two layers being wound with essentially opposite winding angles and being locally held together.

21. A method according to claim 20, wherein at least one discrete string of binding material is applied to the contacting surfaces of neighbouring protective layers, said string of binding material being arranged to extend in a longitudinal direction of the flexible pipe and to cross the composite wires of said protective layers.

22. A method according to claim 20, further comprising providing a number of chords, and arranging said chords to a wire so that at least one of said chords is locally linked to at least one neighbouring chord.

23. A method according to claim 22, further comprising providing a number of threads wherein least one thread comprises a binding material, and arranging said threads to a chord.

24. A method according to claim 23, wherein said threads are twisted around a longitudinal axis of the chord.

25. A method according to claim 24, wherein further comprising providing a central element and winding said threads around said central element.

26. A method according to claim 22, comprising arranging a binding material between adjacent longitudinal surfaces of said neighbouring chords.

27. A method according to claim 22, comprising arranging adjacent longitudinal surfaces of said neighbouring chords to be fully or partially melted together.

* * * * *

UNITED STATES PATENT AND TRADEMARK OFFICE
CERTIFICATE OF CORRECTION

| | | |
|---|---|---|
| PATENT NO. | : 8,082,954 B2 | Page 1 of 1 |
| APPLICATION NO. | : 10/575134 | |
| DATED | : December 27, 2011 | |
| INVENTOR(S) | : Jan Rytter | |

It is certified that error appears in the above-identified patent and that said Letters Patent is hereby corrected as shown below:

Column 13, line 45, please add a -- , -- between "together" and "each"

Column 16, line 22, please add the word -- at -- between "wherein" and "least"

Signed and Sealed this
Fifteenth Day of May, 2012

David J. Kappos
*Director of the United States Patent and Trademark Office*